S. G. NEAL.
AIR RETAINING VALVE FOR AIR BRAKE APPARATUS.
APPLICATION FILED AUG. 31, 1914.
1,125,151.
Patented Jan. 19, 1915.
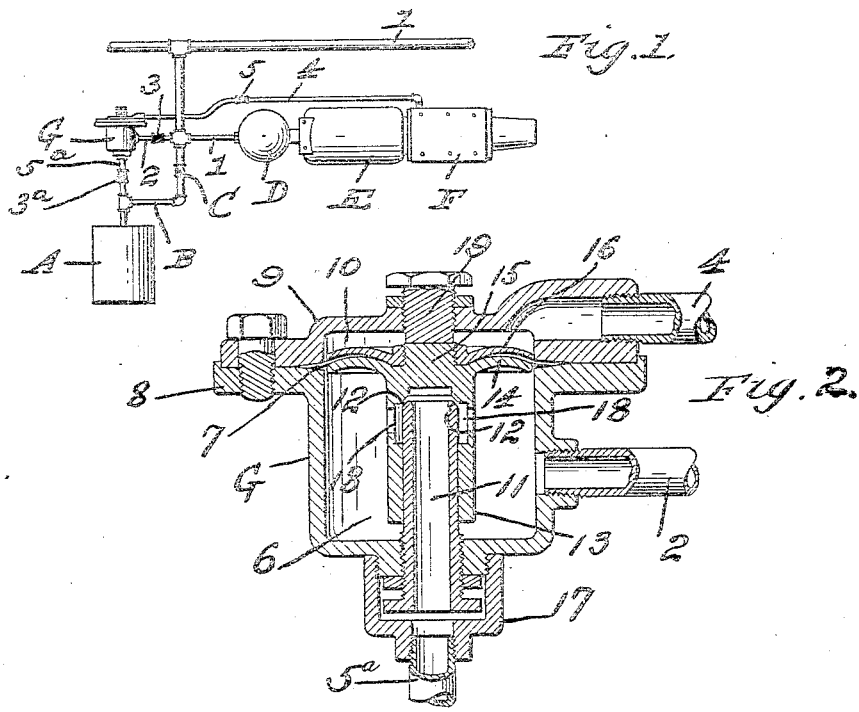
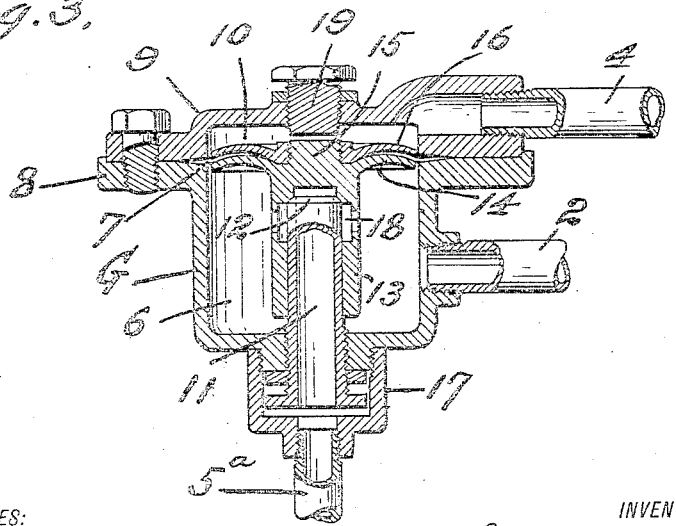
WITNESSES:
INVENTOR
Spencer G. Neal,
BY
ATTORNEYS

UNITED STATES PATENT OFFICE.

SPENCER G. NEAL, OF LOS ANGELES, CALIFORNIA, ASSIGNOR TO CALIFORNIA VALVE AND AIR BRAKE COMPANY, OF LOS ANGELES, CALIFORNIA, A CORPORATION OF CALIFORNIA.

AIR-RETAINING VALVE FOR AIR-BRAKE APPARATUS.

1,125,151.   Specification of Letters Patent.   Patented Jan. 19, 1915.

Application filed August 27, 1914. Serial No. 858,805.

*To all whom it may concern:*

Be it known that I, SPENCER G. NEAL, a citizen of the United States, residing in the city of Los Angeles, county of Los Angeles, State of California, have invented certain new and useful Improvements in Air-Retaining Valves for Air-Brake Apparatus, of which the following is a specification.

This invention relates to certain improvements in air brake apparatus shown in my Patent No. 1,082,758, patented December 30, 1913. In that patent I have shown a reservoir for augmenting the train pipe capacity, one of said reservoirs being located adjacent to and connected with each braking unit. The purpose of thus increasing the train pipe capacity, as fully set out in my aforesaid patent, is to permit train pipe air to be used for ordinary service applications of the brakes without materially reducing train pipe pressure, the advantage of which is clearly pointed out in my said patent.

In an air braking apparatus such as shown in my aforesaid patent, train pipe air is used for service applications until the train pipe and brake cylinder pressures have equalized, at which time the triple valve is operated to introduce auxiliary reservoir air into the brake cylinder for emergency applications or service emergency applications, as fully set forth in my aforesaid patent.

The object of the present invention is to provide a valve to control communication between the augmenting reservoir and the train line which will be controlled by the brake cylinder pressure, whereby when the brake cylinder pressure exceeds the train line pressure communication between the train line and the augmenting reservoir will be closed. The purpose of this is to prevent the depletion of the augmenting reservoirs after the train line and brake cylinder pressures have equalized and auxiliary reservoir pressure has been admitted to the brake cylinder. It is manifest that when this equalization has taken place and auxiliary reservoir pressure has been admitted to the brake cylinder any further depletion of train line pressure is unnecessary and has no effect upon the braking apparatus. In the ordinary operation of the braking apparatus the train line pressure should not be reduced below the equalization pressure, but it frequently happens that leaks occur in the train line, or the train line breaks. It also sometimes occurs that the engineer will deplete the train line after the equalization has taken place. It is the purpose of this invention to prevent the depletion of the augmenting reservoirs under such conditions. It is manifest that should these reservoirs be unnecessarily depleted the time required for recharging them is increased.

In the drawing, Figure 1 is a diagrammatic view of a portion of an air brake apparatus constructed substantially as shown in my Patent No. 1,082,758; Fig. 2 a vertical sectional view of the retaining valve showing the valve open and the train line in communication with the augmenting reservoir; and Fig. 3 a similar view showing the valve closed.

Referring to the various parts by numerals, 1 designates a portion of the train line; A the augmenting reservoir connected to the train line through pipe B, direct communication between the said reservoir A and the train line being controlled by the hand valve C. D designates the triple valve; E the auxiliary reservoir and F the brake cylinder. All of these parts are constructed and operate precisely as shown and described in my aforesaid patent.

The retaining valve consists of an outer main casing forming a large chamber 6 which is closed at its upper end by a flexible diaphragm 7, the margin of said diaphragm being clamped between an annular flange 8 at the upper end of the casing and a cap 9. This cap 9 forms a chamber 10 above the diaphragm. The main chamber 6 is in communication with the train line through a pipe 2 in which is arranged a hand valve 3 so that said communication may be closed whenever desired. The chamber 10 is in communication with the brake cylinder through pipe 4; and in this pipe is arranged a hand valve 5 by means of which said communication may be closed whenever desired.

Extending upwardly through the bottom of the casing of the retaining valve and into the chamber 6 is an open-ended tubular post 11 having a valve seat 12 formed at its upper end. Sliding on this post is a tubular valve 13 which is adapted to seat on the upper end of the post 11. The tubular valve is formed with a disk-like flange 14 at its upper end which is adapted to bear against the under side of the diaphragm 7. It is also provided with a threaded stem 15 which passes upwardly through the diaphragm and is adapted to receive a clamping disk 16, the diaphragm being clamped between the flange 14 and the disk 16 so that the tubular valve 13 will reciprocate in response to the movements of the diaphragm. The tubular valve 13 is provided with ports 18 which place the chamber 6 in communication with the interior of said valve so that when said valve is raised from the seat 12 chamber 6 will be in open communication with the interior of post 11 and a pipe $5^a$.

Through the center of the cap 9 is screwed an adjustable stop 19 which is adapted to limit the vertical movement of the diaphragm.

The lower end of the post 11 is inclosed by means of a cap 17 to the lower end of which is connected the pipe $5^a$, said pipe being directly connected to the augmenting reservoir A, the hand valve $3^a$ controlling communication between the valve G and said reservoir.

It is manifest from the foregoing that brake cylinder pressure will be maintained in chamber 10 above the diaphragm and that train pipe pressure will be maintained in chamber 6 and in the augmenting reservoir. When train pipe pressure exceeds brake cylinder pressure the tubular valve 13 will be maintained in its raised position and the chamber 6 will be in direct open communication with the augmenting reservoir around the upper end of the post 11 and valve seat 12 and through the ports 18. When, however, after a service emergency application of the brakes or an emergency application of the brakes, the brake cylinder pressure exceeds the train pipe pressure, the pressure in chamber 10 will depress the diaphragm, seat valve 13 and close communication between chamber 6 and the augmenting reservoir, thereby preventing any further depletion of the air pressure therein into the train pipe. This position of the valve will be maintained until the brake cylinder pressure is released or the train pipe pressure raised sufficiently to overcome the pressure in chamber 10.

From the foregoing it is manifest that by means of the retaining valve the air pressure in the augmenting reservoirs will be retained therein after an equalization of train pipe and brake cylinder pressures and the release of the auxiliary reservoir pressure. It is also clear that this valve prevents the unnecessary depleting of the augmenting reservoir pressure below the point of equalization between the train line and brake cylinder, regardless of train pipe reduction below the said point of equalization.

What I claim is:

1. In an air brake apparatus the combination of a train line, a train line augmenting reservoir, a brake cylinder, a retaining valve controlling communication between the augmenting reservoir and the train line, and means whereby said valve will be closed when the brake cylinder pressure exceeds train line pressure.

2. In an air brake apparatus the combination of a triple valve, a brake cylinder, an auxiliary reservoir, a train line, a train line augmenting reservoir, a triple valve controlling communication between the train line and the brake cylinder, and a retaining valve controlling communication between the augmenting reservoir and the train line and adapted to be closed by the brake cylinder pressure when said pressure exceeds train line pressure.

3. A retaining valve for an air brake apparatus comprising a casing, a diaphragm within said casing and dividing it into two chambers, means adapted to connect one of said chambers to a brake cylinder, means adapted to connect the other chamber to a train line, means adapted to connect this latter chamber with a train line augmenting reservoir, and means carried by the diaphragm to control communication between the train line and the augmenting reservoir.

4. A retaining valve for an air brake apparatus comprising a casing, a diaphragm within said casing and dividing it into two chambers, means adapted to connect one of said chambers to a brake cylinder, means adapted to connect the other chamber to a train line, means adapted to connect this latter chamber with a train line augmenting reservoir, and means operated by the diaphragm to control communication between the train line and the augmenting reservoir.

5. A retaining valve for an air brake apparatus, comprising a casing, a diaphragm within said casing and dividing it into two chambers, means adapted to connect one of said chambers to a brake cylinder, means adapted to connect the other chamber to a train line, means adapted to connect this latter chamber to a train line augmenting reservoir, and a valve carried by the diaphragm, and controlling communication between the train line and the augmenting reservoir, said valve being closed when the brake cylinder pressure exceeds train line pressure, and being opened when train line pressure exceeds brake cylinder pressure.

6. A retaining valve for an air brake apparatus comprising a casing, a diaphragm within said casing and dividing it into two chambers, means adapted to connect one of said chambers to a brake cylinder, means adapted to connect the other chamber to a train line, means adapted to connect this latter chamber to a train line augmenting reservoir, and a valve operatively connected to the diaphragm and controlling communication between the train line and the augmenting reservoir, said valve being closed when the brake cylinder pressure exceeds train line pressure, and being opened when train line pressure exceeds brake cylinder pressure.

In testimony whereof I hereunto affix my signature in the presence of two witnesses.

SPENCER G. NEAL.

Witnesses:
C. L. BUNDY,
GEO. PIERCE.